(12) United States Patent
Freeman et al.

(10) Patent No.: US 11,149,640 B2
(45) Date of Patent: Oct. 19, 2021

(54) CIRCULAR SEAL OUTER DIAMETER SEAL EFFECTIVENESS TESTING TOOL

(71) Applicant: United Technologies Corporation, Farmington, CT (US)

(72) Inventors: Thomas Freeman, Kennebunk, ME (US); Billie Rosalie Maldonado, Amesbury, MA (US); Alexander Rothchild, Saco, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 154 days.

(21) Appl. No.: 16/569,974

(22) Filed: Sep. 13, 2019

(65) Prior Publication Data

US 2021/0079842 A1    Mar. 18, 2021

(51) Int. Cl.
*F02C 7/06*         (2006.01)
*F01D 25/18*        (2006.01)

(52) U.S. Cl.
CPC .............. *F02C 7/06* (2013.01); *F01D 25/186* (2013.01); *E21B 2200/01* (2020.05); *F05D 2260/83* (2013.01); *F16C 2360/23* (2013.01); *F16L 2201/30* (2013.01)

(58) Field of Classification Search
CPC ...... F05D 2260/83; F02C 7/06; F01D 25/186; F16L 2201/30; G01M 3/00; G01M 3/025; F16C 2360/23
See application file for complete search history.

(56) References Cited

U.S. PATENT DOCUMENTS

| 3,945,574 | A | * | 3/1976 | Polnauer | B05B 7/10 239/404 |
|---|---|---|---|---|---|
| 4,508,356 | A | * | 4/1985 | Janian | F16J 15/3236 277/555 |
| 4,826,214 | A | * | 5/1989 | Ratcliffe | F16L 35/00 285/2 |
| 6,427,523 | B1 | * | 8/2002 | Seabrook | G01M 3/146 73/40.7 |
| 9,239,008 | B2 | * | 1/2016 | Ekanayake | G01M 3/025 |
| 2002/0063396 | A1 | | 5/2002 | Doyle | |
| 2010/0207379 | A1 | * | 8/2010 | Olver | F01D 9/065 285/13 |
| 2015/0330890 | A1 | | 11/2015 | Clevelario et al. | |
| 2016/0281896 | A1 | * | 9/2016 | Matteson | B64G 1/00 |
| 2018/0187805 | A1 | | 7/2018 | Bancroft et al. | |
| 2019/0017605 | A1 | | 1/2019 | Miller et al. | |

FOREIGN PATENT DOCUMENTS

| FR | 2974532 A1 | 11/2012 |
|---|---|---|
| WO | 2018085327 A1 | 5/2018 |
| WO | 2018178201 A1 | 10/2018 |

* cited by examiner

*Primary Examiner* — Jesse S Bogue
*Assistant Examiner* — Loren C Edwards
(74) *Attorney, Agent, or Firm* — Cantor Colburn LLP

(57) ABSTRACT

A seal testing tool for use with a bearing housing of a gas turbine engine including: a first end surface; a second end surface opposite the first end surface; and a boss extending away from the first end surface. The boss extending from a proximal end located at the first end surface to a distal end located opposite the proximal end. The boss includes: a passageway extending from the distal end to the second end surface through the boss; an external surface extending from the proximal end to the distal end; and a seal groove in the external surface located at the proximal end of the boss.

18 Claims, 8 Drawing Sheets

CIRCULAR SEAL OUTER DIAMETER SEAL EFFECTIVENESS TESTING TOOL

BACKGROUND

The subject matter disclosed herein generally relates to gas turbine engines and, more particularly, to testing a bearing housing of a gas turbine engine.

Gas turbine engines typically include a fan section, a compressor section, a combustor section and a turbine section. A fan section may drive air along a bypass flow path while a compressor section may drive air along a core flow path. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Gas turbine engines generally include one or more bearing systems that support rotation of various components relative to an engine static structure or engine case. Gas turbine engines may use oil for cooling and lubrication of the bearing systems. Lubrication systems, such as those used in aircraft gas turbine engines, supply lubricant to bearings, gears and other engine components that use lubrication. The lubricant, typically oil, cools the components and protects them from wear. A typical oil lubrication system includes conventional components such as an oil tank, pump, filter and oil supply conduits. Tubing and conduits of various types can be used to route fluids throughout an engine.

SUMMARY

According to an embodiment, a seal testing tool for use with a bearing housing of a gas turbine engine is provided. The seal testing tool including: a first end surface; a second end surface opposite the first end surface; and a boss extending away from the first end surface. The boss extending from a proximal end located at the first end surface to a distal end located opposite the proximal end. The boss includes: a passageway extending from the distal end to the second end surface through the boss; an external surface extending from the proximal end to the distal end; and a seal groove in the external surface located at the proximal end of the boss.

In addition to one or more of the features described above, or as an alternative, further embodiments may include: an O-ring seal located in the seal groove.

In addition to one or more of the features described above, or as an alternative, further embodiments may include that the passageway is concentric to the external surface.

In addition to one or more of the features described above, or as an alternative, further embodiments may include a first recess in the first end surface proximate the proximal end of the boss.

In addition to one or more of the features described above, or as an alternative, further embodiments may include that the first recess extends completely circumferentially around the proximal end of the boss.

In addition to one or more of the features described above, or as an alternative, further embodiments may include a second recess in the first end surface proximate the first recess. The second recess being recessed relative to the first recess.

In addition to one or more of the features described above, or as an alternative, further embodiments may include that the second recess extends at least partially circumferentially around the first recess.

In addition to one or more of the features described above, or as an alternative, further embodiments may include a mounting arm extending from the first end surface to the second end surface, wherein the first recess is recessed from the first end surface at the mounting arm.

In addition to one or more of the features described above, or as an alternative, further embodiments may include that the mounting arm further includes a fastener through hole that extends from the second end surface to the first end surface through the mounting arm.

According to another embodiment, a proof pressure testing apparatus is provide. The proof pressure testing apparatus including: a bearing housing defining a bearing compartment. The bearing housing including: a radially outward surface and a mounting platform located on the radially outward surface. The mounting platform including a mounting surface. The bearing housing including a supply orifice extending from the mounting surface of the bearing housing into the bearing housing to a bottom and fluidly connecting to the bearing compartment. The supply orifice includes a first portion extending from the mounting surface to a seat surface and a second portion extending from the seat surface to the bottom. The bearing housing a including a C-seal located in the first portion and a seal testing tool. The seal testing tool including: a first end surface; a second end surface opposite the first end surface; and a boss extending away from the first end surface and into the supply orifice, the boss extending from a proximal end located at the first end surface to a distal end located opposite the proximal end. The boss includes: a passageway extending from the distal end to the second end surface through the boss; an external surface extending from the proximal end to the distal end; a seal groove in the external surface located at the proximal end of the boss; and an O-ring seal located in the seal groove, the O-ring seal abutting the C-seal.

In addition to one or more of the features described above, or as an alternative, further embodiments may include that the O-ring seal at least partially compresses the C-seal.

In addition to one or more of the features described above, or as an alternative, further embodiments may include that the passageway is concentric to the external surface.

In addition to one or more of the features described above, or as an alternative, further embodiments may include that the seal testing tool further includes: a first recess in the first end surface proximate the proximal end of the boss.

In addition to one or more of the features described above, or as an alternative, further embodiments may include that the first recess extends completely circumferentially around the proximal end of the boss.

In addition to one or more of the features described above, or as an alternative, further embodiments may include that the seal testing tool further includes: a second recess in the first end surface proximate the first recess, the second recess being recessed relative to the first recess.

In addition to one or more of the features described above, or as an alternative, further embodiments may include that the second recess extends at least partially circumferentially around the first recess.

In addition to one or more of the features described above, or as an alternative, further embodiments may include that the seal testing tool further includes: a mounting arm extending from the first end surface to the second end surface, wherein the first recess is recessed from the first end surface at the mounting arm.

In addition to one or more of the features described above, or as an alternative, further embodiments may include that the mounting arm further includes a fastener through hole that extends from the second end surface to the first end surface through the mounting arm.

According to another embodiment, a method of performing a proof pressure test on a bearing housing for a gas turbine engine is provided. The method including that a bearing housing is obtained. The bearing housing defining a bearing compartment. The bearing housing includes: a radially outward surface and a mounting platform located on the radially outward surface. The mounting platform including a mounting surface. The bearing housing also includes a supply orifice extending from the mounting surface of the bearing housing into the bearing housing to a bottom and fluidly connecting to the bearing compartment. The supply orifice includes a first portion extending from the mounting surface to a seat surface and a second portion extending from the seat surface to the bottom. The bearing housing also includes a C-seal located in the first portion. The method also includes that a seal testing tool is obtained. The seal testing tool including: a first end surface; a second end surface opposite the first end surface; and a boss extending away from the first end surface. The boss extending from a proximal end located at the first end surface to a distal end located opposite the proximal end. The boss includes: a passageway extending from the distal end to the second end surface through the boss; an external surface extending from the proximal end to the distal end; a seal groove in the external surface located at the proximal end of the boss; and an O-ring seal located in the seal groove. The O-ring seal abutting the C-seal. The method further includes that the boss of the seal testing tool is inserted into the supply orifice of the bearing housing, the seal testing tool is secured to the bearing housing, the paths between the bottom of the supply orifice and the bearing compartment are plugged, fluid pressure is applied to the passageway, and leaks are checked for proximate an interface of the O-ring seal and the C-seal.

In addition to one or more of the features described above, or as an alternative, further embodiments may include that applying a leak detection solution proximate to the interface of the O-ring seal and the C-seal.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
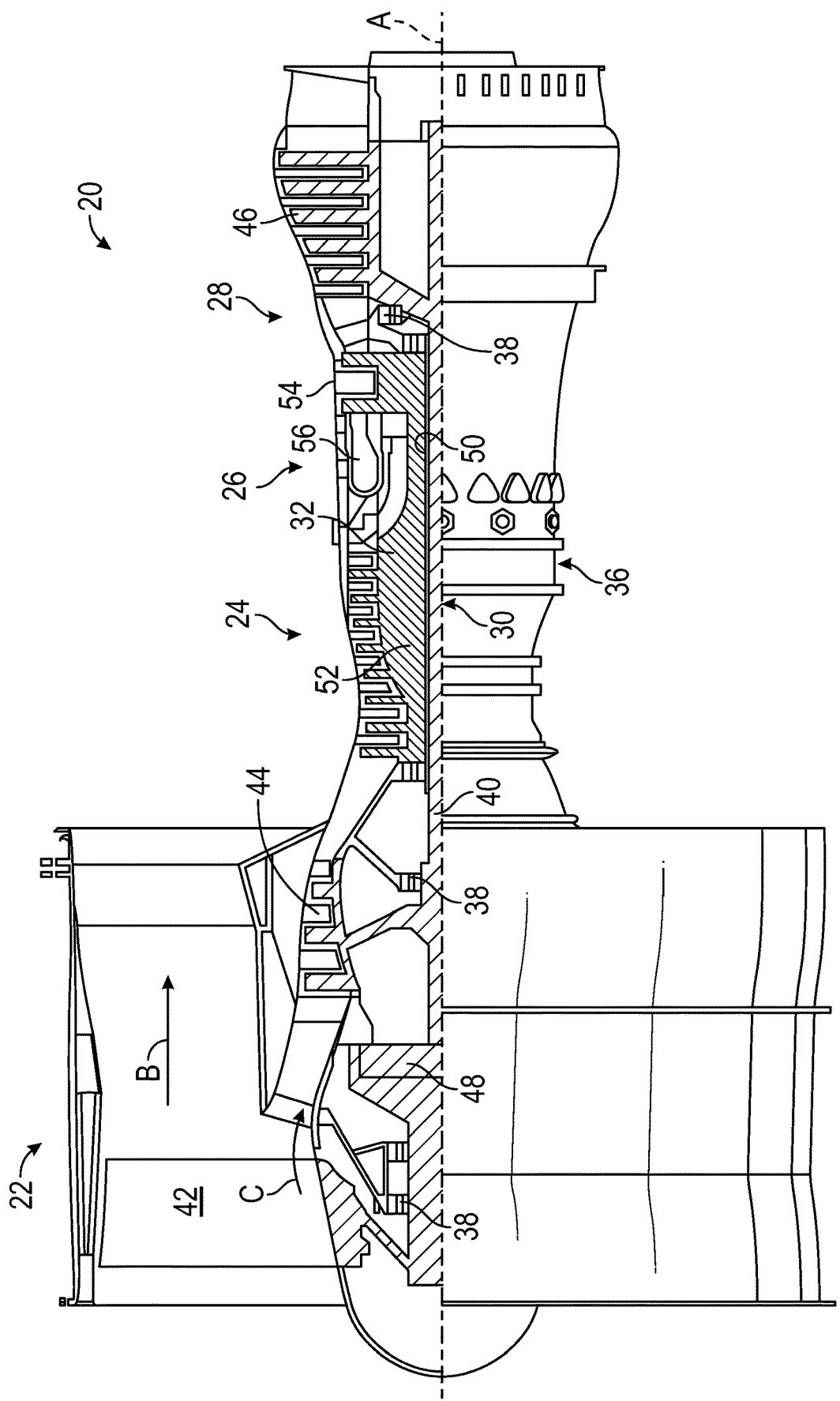
FIG. 1 is a partial cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
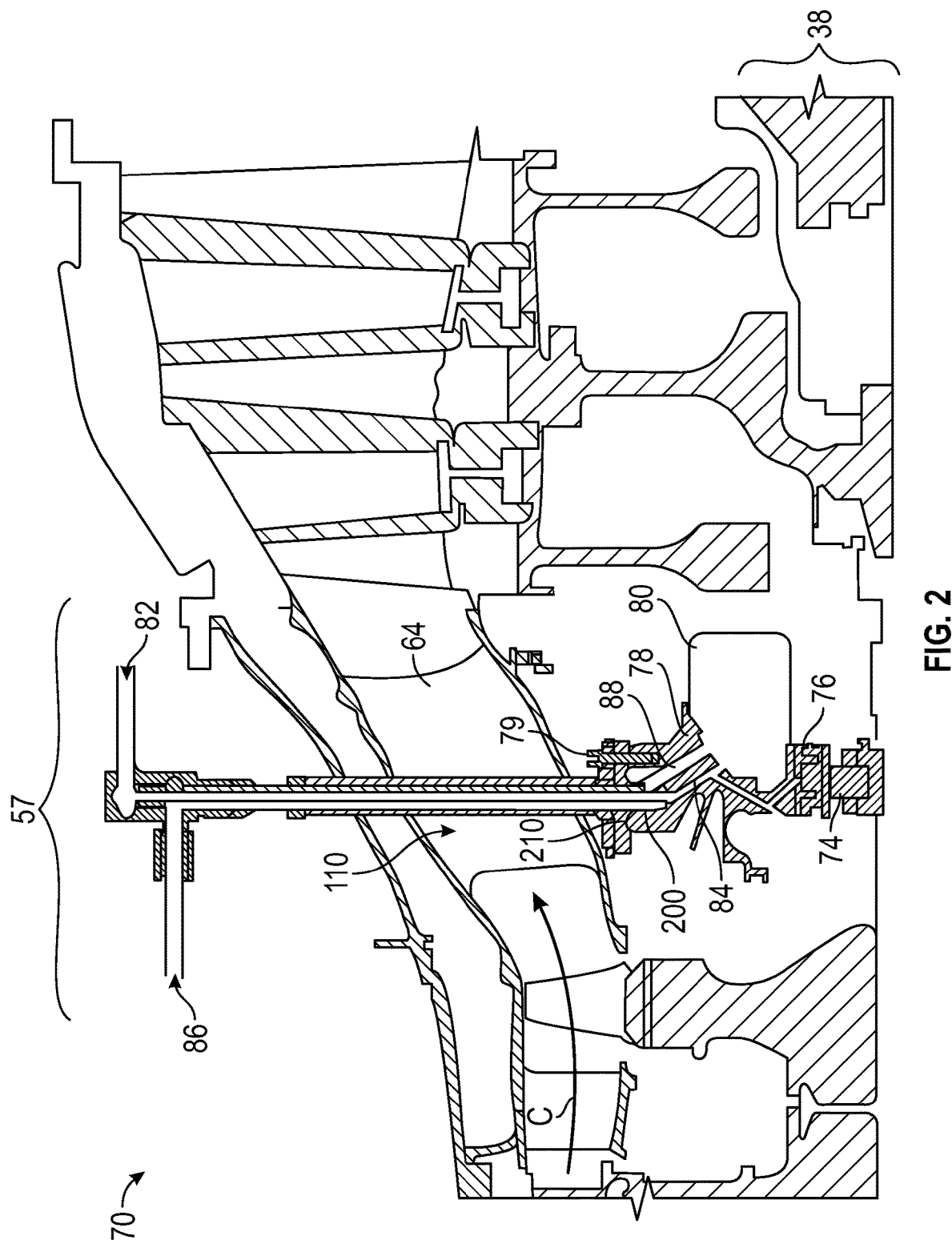
FIG. 2 illustrates a cross-sectional view of a turbine section with a mid-turbine frame and an oil supply tube, in accordance with various embodiment, in accordance with an embodiment of the present disclosure.

Referring now to FIG. 2, with continued reference to FIG. 1, a portion of an engine section 70 is illustrated, in accordance with an embodiment of the present disclosure. Although the engine section 70 is illustrated in FIG. 2, for example, as a turbine section, it will be understood that the embodiments of the present disclosure are not limited to the turbine section, and could extend to other bearing assemblies located in other sections of the gas turbine engine 20. In various embodiments, the engine section 70 may include mid-turbine frame 57 of gas turbine engine 20. The mid-turbine frame 57 may be located aft of the high pressure turbine 54 and forward of the low pressure turbine 46 and may be mechanically coupled to the bearing system 38.

In various embodiments, the mid-turbine frame 57 may include a bearing 74, a bearing damper 76, and a bearing housing 78, which may define a bearing compartment 80. The mid-turbine frame 57 may include a tubing assembly 110 for fluid delivery to the bearing system 38. The tubing assembly 110 is secured to the bearing housing 78 via one or more fasteners 79, such as, for example, a bolt or screw. The tubing assembly 110 may be coupled to bearing housing 78 at a supply orifice 200 within a bearing housing 78. The supply orifice 200 extending from a radially outward surface 210 of the bearing housing 78 into the bearing housing 78. The supply orifice 200 is fluidly connected to the bearing compartment 80. The tubing assembly 110 may be configured to transport fluid to and/or from the bearing compartment 80 and the bearing damper 76. For example, the tubing assembly 110 may deliver a first fluid from a first fluid source 82 to bearing damper 76 through a bearing damper path 84 defined by bearing housing 78. The first fluid may be used to lubricate bearing damper 76. The tubing assembly 110 may deliver a second fluid from a second fluid source 86 to bearing compartment 80 through a bearing compartment path 88 defined by the bearing housing 78. The second fluid may be used to lubricate at least a portion of bearing compai Unent 80. It is understood that while a multiwall tubing assembly is utilized for exemplary illustration, the embodiments disclosed herein may be applicable to other bearing housings not utilizing a multiwall tubing system.

The tubing assembly 110 may extend through the airfoil 64. Hot exhaust gas in core flow path C may impinge on the airfoil 64 which may cause the airfoil 64 to increase in temperature due to convective heat transfer from the hot exhaust. In various embodiments, heat may radiate to other nearby components which may cause the nearby components to increase in temperature. In return, the nearby components may transfer heat to other adjacent components and/or fluids. For example, heat may radiate from the airfoil 64 to tubing assembly 110 and may convectively transfer heat from the airfoil 64 to the tubing assembly 110. The tubing assembly 110 may be configured to limit heat transfer to the fluids within the multiwall tubing assembly 110.

Figure 3:
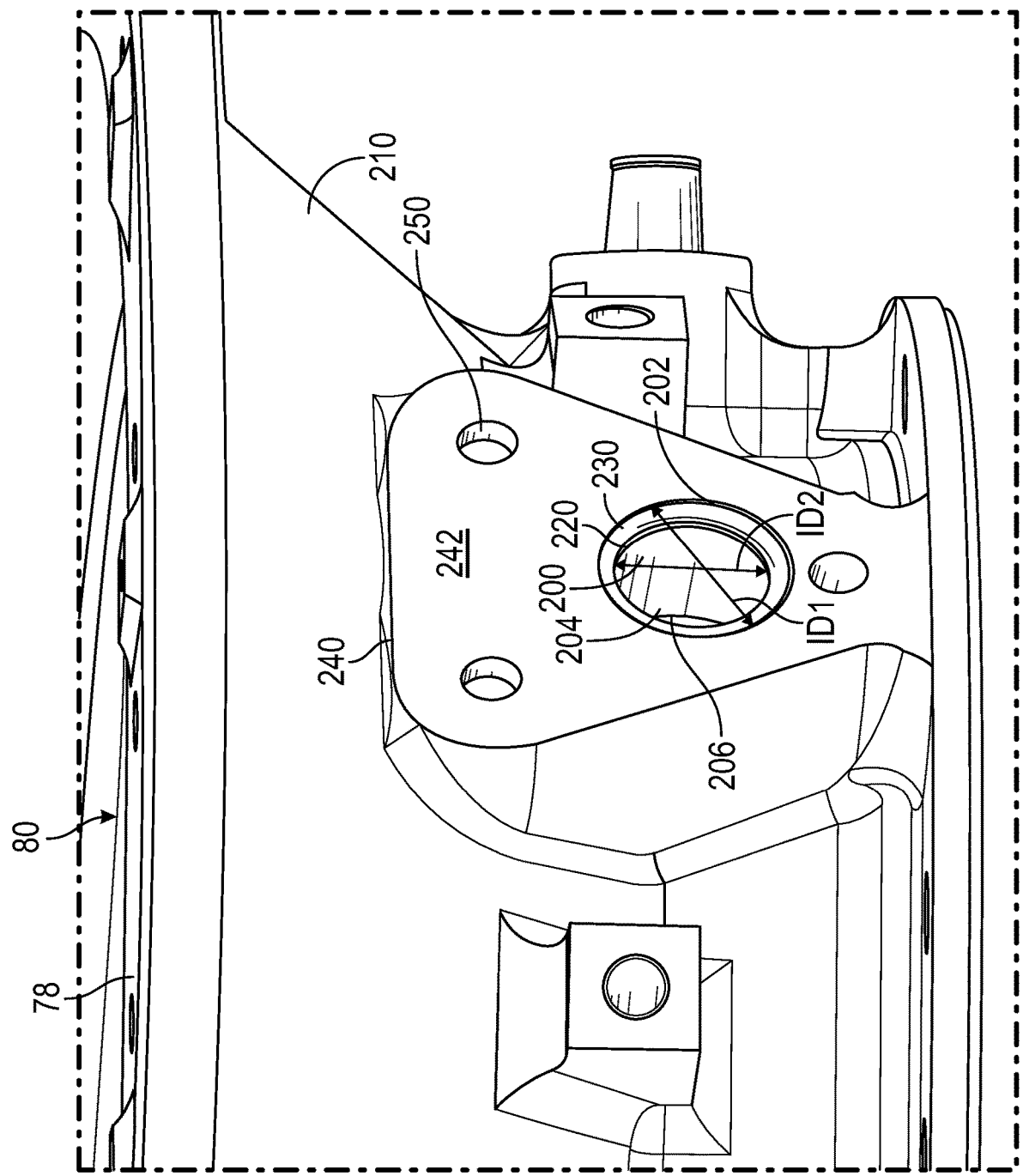
FIG. 3 illustrates a bearing housing, in accordance with an embodiment of the present disclosure.

Referring now to FIG. 3, with continued reference to FIGS. 1 and 2, the bearing housing 78 is illustrated, in accordance with an embodiment of the present disclosure. The bearing housing 78 includes the supply orifice 200 within a bearing housing 78. The supply orifice 200 is located on a mounting platform 240 on the radially outward surface 210 of the bearing housing 78. The mounting platform 240 has a mounting surface 242 that is flat or planar. The supply orifice 200 extends from the mounting surface 242 of the bearing housing 78 into the bearing housing 78 to a bottom 206 and is fluidly connected to the bearing compartment 80.

The supply orifice 200 is fluidly connected to the bearing compartment 80. The supply orifice 200 is a countersunk hole that includes a first portion 202 proximate the mounting surface 242 and a second portion 204 adjacent to the first portion 202. An inner diameter ID1 of the supply orifice 200 within first portion 202 is greater than an inner diameter ID2 of the supply orifice 200 within the second portion 204. The first portion 202 extends from the mounting surface 242 to a seat surface 220 and the second portion 204 extends from the seat surface 220 to a bottom 206 of the supply orifice 200. The supply orifice 200 may be round in shape, as illustrated in FIG. 3. A C-seal 230 may be located (i.e., installed) within the first portion of the supply orifice 200.

The C-seal 230 compresses against the seat surface 220 and the first portion 202 of the supply orifice 200 to form a sealing interface. The C-seal 230 is a radial seal that compresses against the counterbore wall of the first portion 202 and a mating oil tube of the tubing assembly 110. The C-seal 230 is to aid with sealing around the tubing assembly 110.

The tubing assembly 110 mounts flush onto the mounting surface 242. The tubing assembly 110 is secured to the bearing housing 78 via one or more fasteners 79. The fasteners 79 secure to a fastening orifice 250 located on the mounting platform 240. The fastening orifices 250 extend from the mounting surface 242 into the bearing housing 78. There may be one or more fastening orifices 250 located on the mounting surface 242. In an embodiment, there may be three fastening orifices 250 located on the mounting surface 242, as illustrated in FIG. 3. The fasteners 79 may be inserted into the fastening orifices 250 at the mounting surface 242 and nuts (not shown for simplicity may threaded onto external threads on a shank of fastener 79 to secure the fastener 79 within the fastening orifice 250. Additionally, the mounting platform 240 may be utilized to secure a seal testing tool 300 (See FIGS. 4-8) rather than the tubing assembly 110 as discussed further herein.

Figure 4:
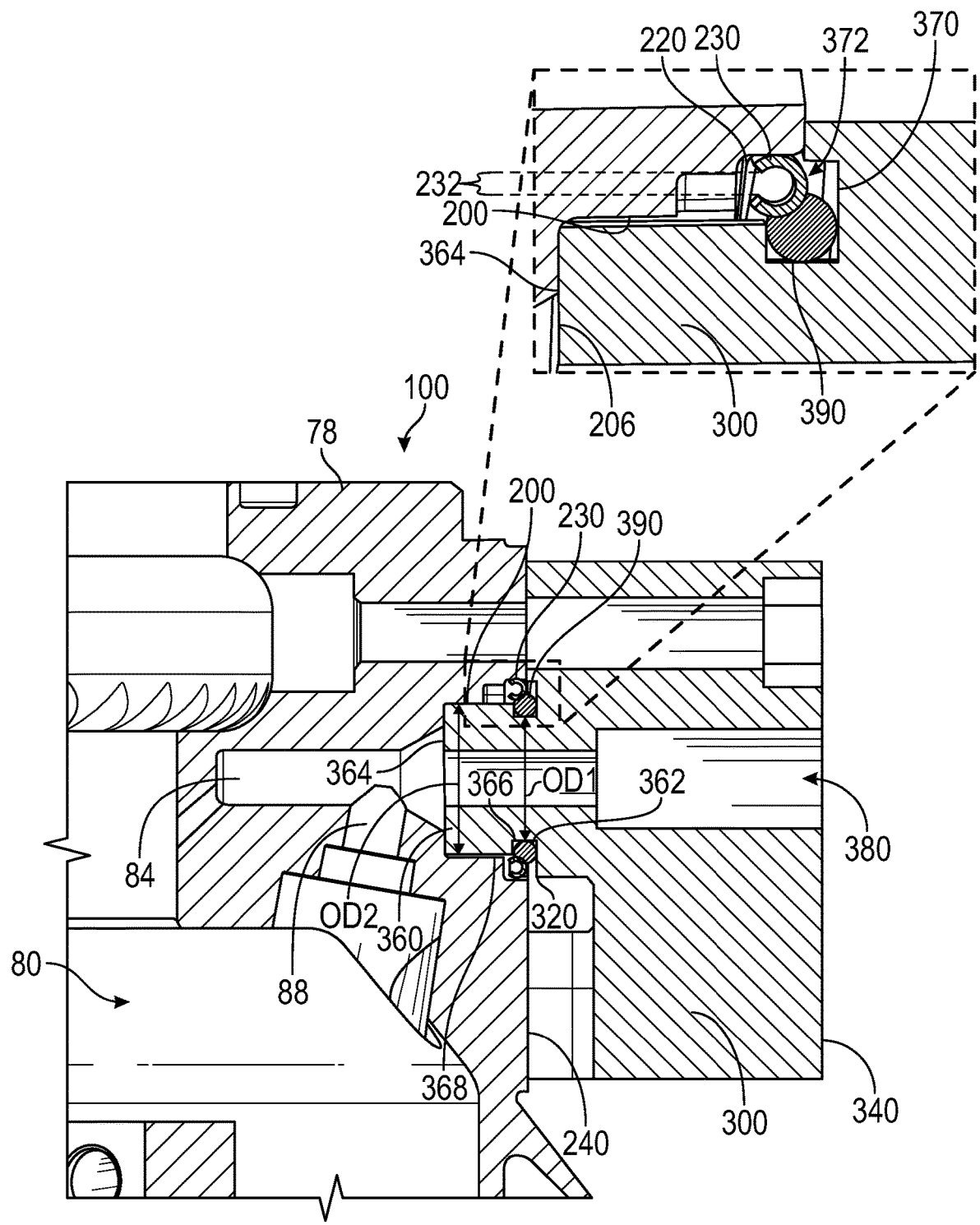
FIG. 4 illustrates a seal testing tool and the bearing housing of FIG. 3, in accordance with an embodiment of the present disclosure.

Referring now to FIG. 4, with continued reference to FIGS. 1-4, a proof pressure testing apparatus 100 comprising a seal testing tool 300 and the bearing housing 78 is illustrated, in accordance with an embodiment of the present disclosure. As illustrated in FIG. 4, the seal testing tool 300 mounts onto the mounting surface 242. The seal testing tool 300 includes a first end surface 320 and a second end surface 340 opposite the first end surface 320. The seal testing tool 300 includes a boss 360 extending away from the first end surface 320. The boss 360 extends perpendicularly away from the first end surface 320. The boss 360 is configured to fit within the supply orifice 200 when the seal testing tool 300 is mounted to the mounting surface 242, as illustrated in FIG. 4. The boss 360 extends from a proximal end 362 located at the first end surface 320 to a distal end 364 located opposite the proximal end 362. The distal end 364 abuts the bottom 206 of the supply orifice 200. The boss 360 includes an external surface 368 that extends from the proximal end 362 to the distal end 364.

The boss 360 includes a seal groove 366 that extends completely circumferentially (i.e., 360 degrees) around an external surface 368 of the boss 360. The seal groove 366 may be located at the proximal end 362 of the boss 360 as illustrated in FIG. 4. The external surface 368 has a reduced diameter at the seal groove 366. In other words, the outer diameter OD1 of the external surface 368 at the seal groove 366 is less than the outer diameter OD2 of the external surface 368 between the seal groove 366 and the distal end 364. In an embodiment, the outer diameter OD2 of the external surface 368 is about equal to or less than the inner diameter ID2 of the second portion 204 of the supply orifice 200. The seal testing tool 300 includes an O-ring seal 390 that sits in the seal groove 366. The O-ring seal 390 abuts the C-seal 230. The O-ring seal 390 may be composed of rubber. The O-ring seal 390 is configured to impinge upon the C-seal 230. The O-ring seal 390 may at least partially compress the C-seal 230 to ensure proper setting of the C-seal 230 against the supply orifice 200.

As illustrated in FIG. 4, the C-seal 230 has a "C" shape with an open portion 232 oriented toward the seat surface 220. The open portion 232 allows the C-seal 230 to at least partially compress. The C-seal 230 may be composed of a metallic material. A passageway 380 may extend through the boss 360 from the distal end 364 of the boss 360 to the second end surface 340 of the seal testing tool 300. The passageway 380 may be concentric to the external surface 368 of the boss 360. The passageway 380 may include internal threads configured to mate with external threads of an air compressor or shop air supply, such that the air compressor or shop air supply is secure within the passageway 380 of the seal testing tool 300 for seal testing. The air compressor or shop air supply supplies fluid/air pressure through the passageway 380 during seal testing.

The seal testing tool 300 is mounted to the mounting platform 240 to perform a proof pressure test on the sealing interface between the C-seal 230 and the supply orifice 200 of the bearing housing 78. During the proof pressure test the bearing damper path 84 of the bearing housing 78 and the bearing compartment path 88 of the bearing housing 78 may be plugged and then fluid pressure (e.g., air pressure) may be applied passageway in the boss 360.

The proof pressure test is performed to determine whether there is a leak through the sealing interface between the C-seal 230 and the supply orifice 200 of the bearing housing 78. If a leak exists, the source of the leak may be the C-seal 230 and/or the supply orifice 200 of the bearing housing 78. The source of the leak may be identified by changing out the C-seal 230 with a new C-seal and retesting. If the interface between the C-seal 230 and the supply orifice 200 of the bearing housing 78 still leaks after the C-seal 230 is replaced with a new C-seal then the leak is most likely caused by the supply orifice 200 of the bearing housing 78. If the interface between the C-seal 230 and the supply orifice 200 of the bearing housing 78 does not leak after the C-seal 230 is replaced with a new C-seal then the leak is most likely caused by the supply orifice 200 of the bearing housing 78.

Figure 5:
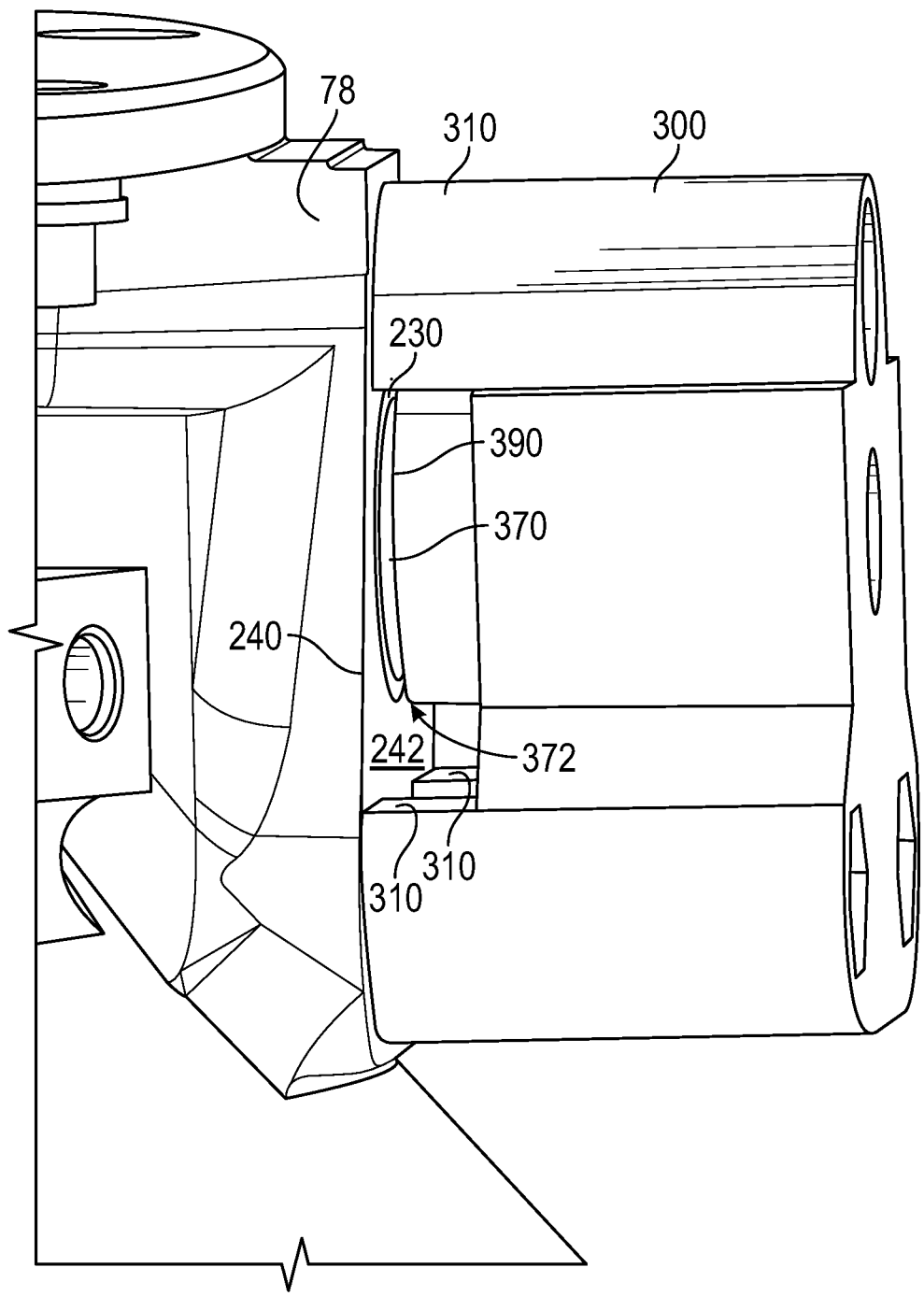
FIG. 5 illustrates a seal testing tool and the bearing housing of FIG. 3, in accordance with an embodiment of the present disclosure.
Figure 6:
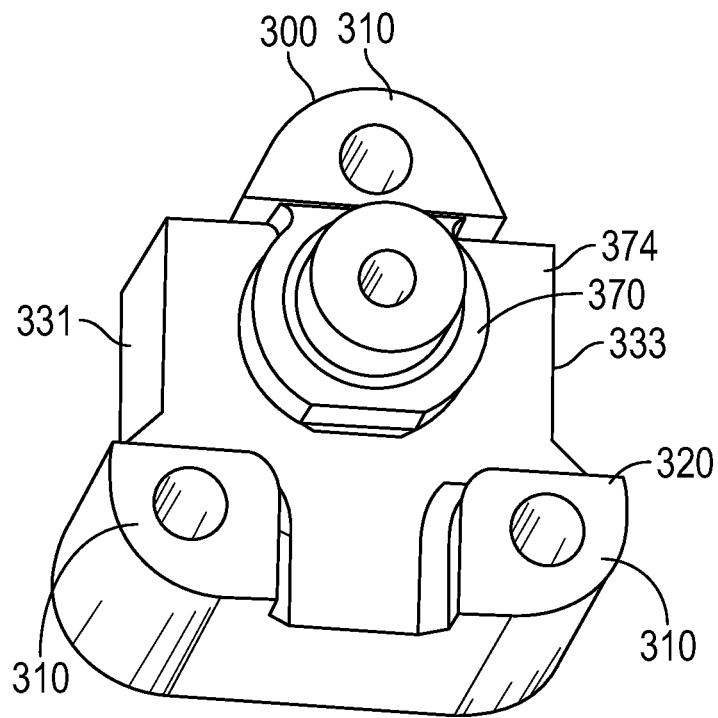
FIG. 6 illustrates a seal testing tool of FIGS. 4 and 5, in accordance with an embodiment of the present disclosure.

Referring to FIGS. 4, 5, and 6, with continued reference to FIGS. 1-3, a viewing gap 372 between the seal testing tool 300 and bearing housing 78 for visibly detecting leaks is illustrated, in accordance with an embodiment of the present disclosure. A first recess 370 may be present in the first end surface 320 proximate the proximal end 362 of the boss 360, such that a viewing gap 372 is formed between the first end surface 320 of the seal testing tool 300 and the mounting platform 240 of the bearing housing 78. The first recess 370 is a recess in the first end surface 320 and is recessed relative to the first end surface 320 at mounting arms 310 of the seal testing tool 300. The mounting arms 310 extend from the first end surface 320 to the second end surface 340. The seal testing tool 300 may include one or more mounting arms 310 that mount to the mounting platform 240. The first end surface 320 of the seal testing tool 300 at the mounting arms 310 may mount flush with the mounting surface 242 of the mounting platform 240.

The first recess 370 may extend completely circumferentially around (i.e., 360 degrees) the proximal end 362 of the boss 360. Advantageously, the first recess 370 allows the C-seal 230 and the O-ring seal 390 to be visible when the seal testing tool 300 is mounted to the mounting platform 240, thus during the proof pressure test a leak detection solution (e.g., soap and water) may be applied to the C-seal 230 and the O-ring seal 390 and leaks may be visible if the leak detection solution begins to bubble from air leaks.

A second recess 374 may be present in the first end surface 320 proximate the first recess 370 of the boss 360, such that a viewing gap 372 is more clearly visible between the first end surface 320 of the seal testing tool 300 and the mounting platform 240 of the bearing housing 78. The second recess 374 is a recess in the first end surface 320 and is recessed relative to the first end surface 320 at mounting arms 310 of the seal testing tool 300 and the first end surface 320 at the first recess 370. The second recess 374 may extend at least partially circumferentially around the first recess 370. The second recess 374 may extend from a first side surface 331 of the seal testing tool 300 to a second side surface 333 of the seal testing tool 300. The second side surface 333 is located opposite the first side surface 331. The first side surface 331 extending from the first end surface 320 of the seal testing tool 300 to the second end surface 340 of the seal testing tool 300. The second side surface 333 extending from the first end surface 320 of the seal testing tool 300 to the second end surface 340 of the seal testing tool 300.

Figure 7:
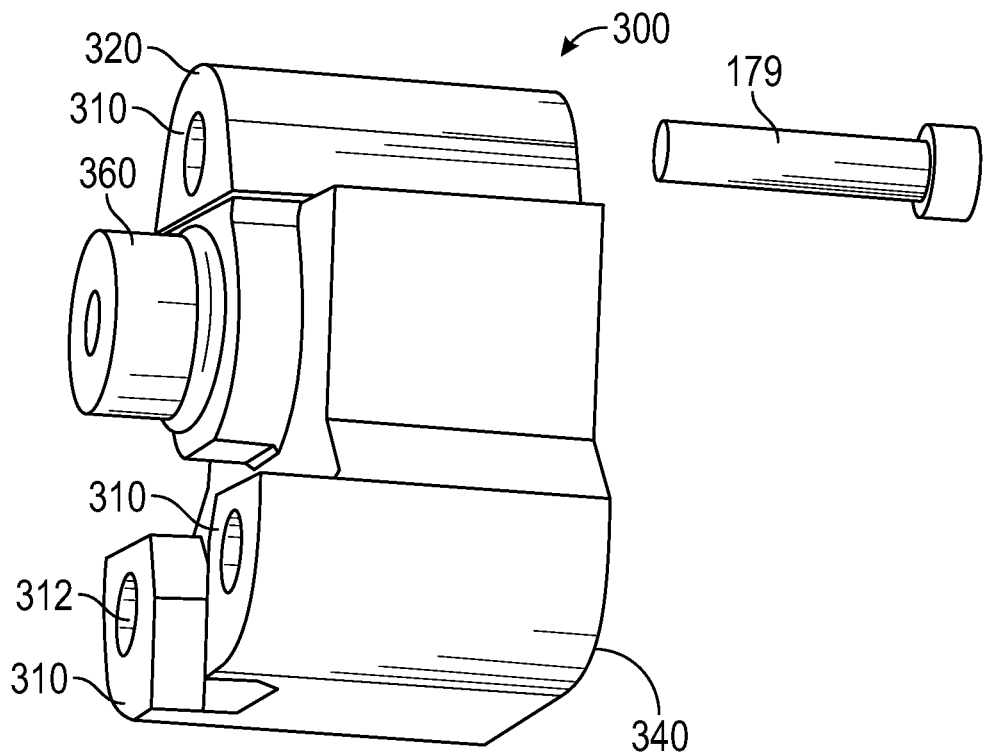
FIG. 7 illustrates a seal testing tool of FIGS. 4 and 5, in accordance with an embodiment of the present disclosure.
Figure 8:
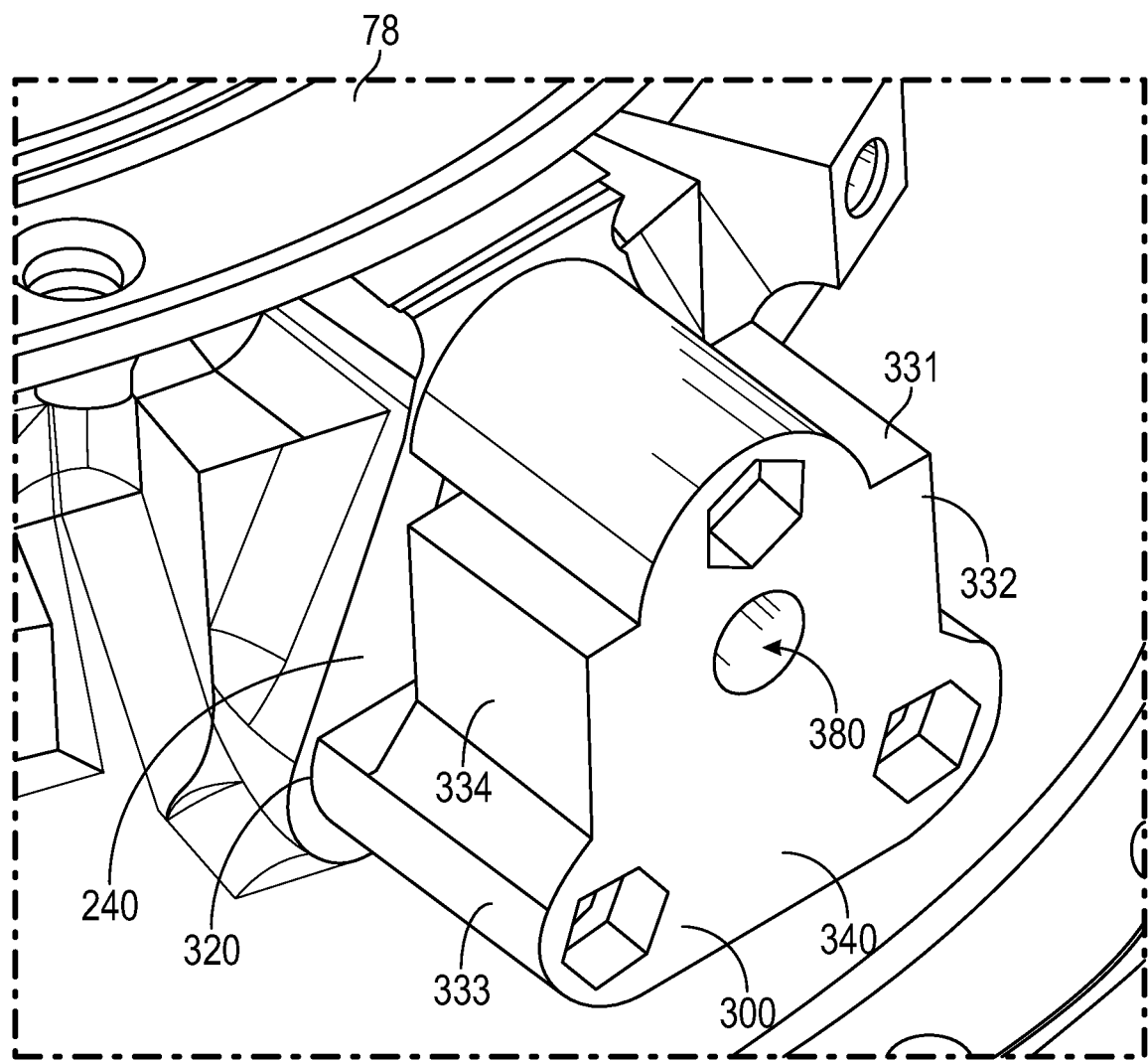
FIG. 8 illustrates a seal testing tool and the bearing housing, in accordance with an embodiment of the present disclosure.

Referring now to FIGS. 7 and 8, with continued reference to FIGS. 1-6, the seal testing tool 300 is illustrated, in accordance with an embodiment of the present disclosure. The seal testing tool 300 may be mounted to the mounting platform 240, as illustrated in FIG. 8. The seal testing tool 300 includes one or more mounting arms 310 to mount to the mounting platform 240. In an embodiment, the seal testing tool 300 includes three mounting arms 310. Each mounting arm 310 may include a fastener through hole 312. The fastener through hole 312 extends from the first end surface 320 of the seal testing tool 300 to the second end surface 340 of the seal testing tool 300 through the mounting arm 310. The fastener through hole 312 may align with fastening orifices 250 on the mounting surface 242 of the bearing housing 78. The fasteners 179 may be inserted through the fastener through hole 312 to a fastening orifice 250 located on the mounting platform 240, thus securing the seal testing tool 300 to the bearing housing 78. In an embodiment, there may be three fastening through holes 312, as illustrated in FIGS. 7 and 8.

The first side surface 331 may include a first flat surface 332 and the second side surface 333 may include a second flat surface 334. The second flat surface 334 may be located opposite the first flat surface 332. The first flat surface 332 extends from the first end surface 320 of the seal testing tool 300 to the second end surface 340 of the seal testing tool 300. The second flat surface 334 extends from the first end surface 320 of the seal testing tool 300 to the second end surface 340 of the seal testing tool 300. The first flat surface 332 may be flat or planar in shape. The second flat surface 334 may be flat or planar in shape. The second flat surface 334 may be about parallel the first flat surface 332. Advantageously, the first flat surface 332 and the second flat surface may be used as flats for a wrench to grip when a pressure gage is installed in the passageway 380 for the proof pressure test.

Figure 9:
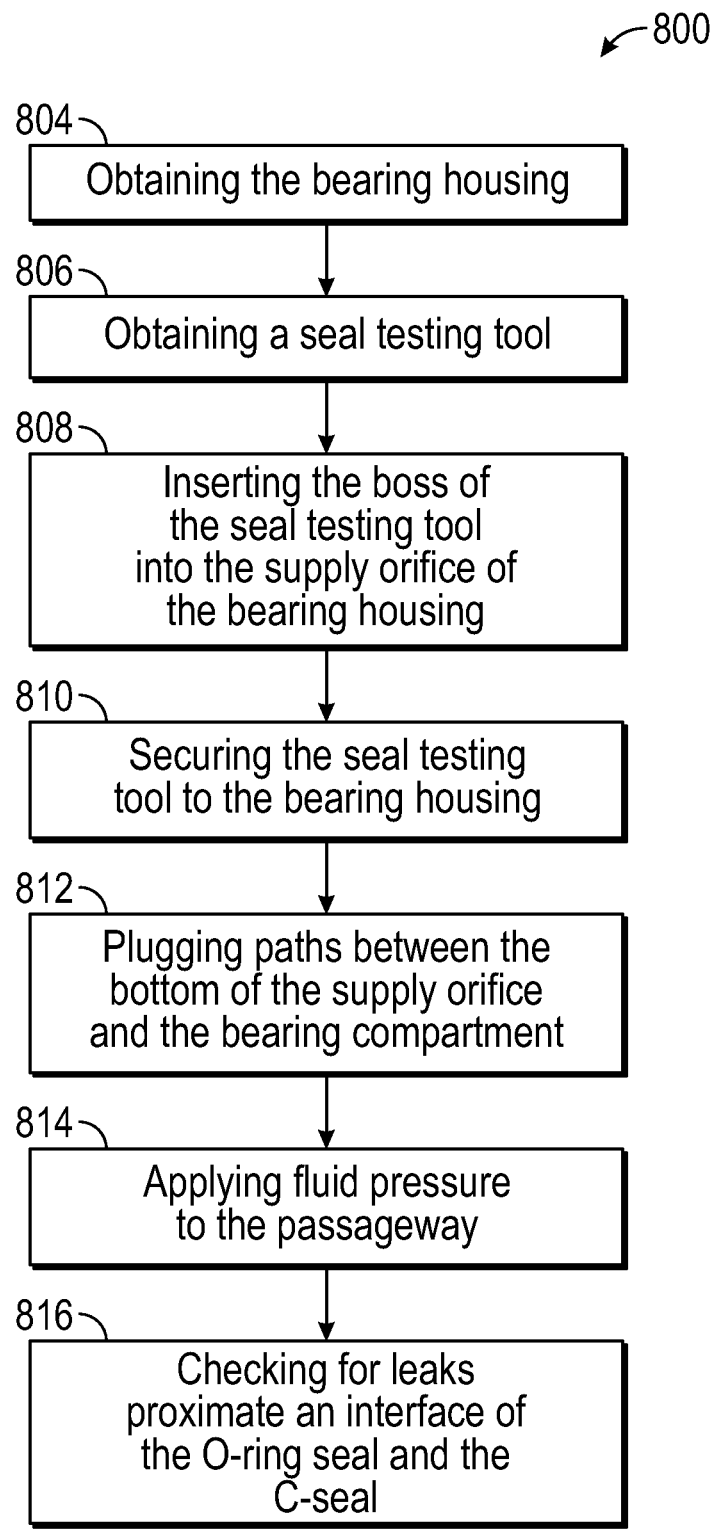
FIG. 9 illustrates a method of performing a proof pressure test on a bearing housing for a gas turbine engine using the seal testing tool, in accordance with an embodiment of the present disclosure.

Referring now to FIG. 9, within continued reference to FIGS. 1-8, a flow process illustrating a method 800 of performing a proof pressure test on a bearing housing 78 for a gas turbine engine 20 is illustrated, according to an embodiment of the present disclosure. At block 804, a bearing housing 78 is obtained. At block 806, a seal testing tool 300 is obtained. At block 808, the boss 360 of the seal testing tool 300 is inserted into the supply orifice 200 of the bearing housing 78.

At block 810, the seal testing tool 300 is secured to the bearing housing 78. At block 812, paths between the bottom 206 of the supply orifice 200 and the bearing compartment 80 are plugged. The paths may include the bearing compartment path 88 and the bearing damper path 84. At block 814, fluid pressure is applied to the passageway 380. Fluid pressure may be applied to the passageway via an air compressor or shop air supply. The air compressor or shop air supply may be configured to thread into the passageway 380 of the seal testing tool 300. At block 816, leaks are checked for proximate an interface of the O-ring seal 390 and the C-seal 230. The method 800 may also include applying a leak detection solution proximate to the interface of the O-ring seal 390 and the C-seal 230 in order to help check for leaks.

While the above description has described the flow process of FIG. 9 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A seal testing tool for use with a bearing housing of a gas turbine engine, the seal testing tool comprising:
   a first end surface;
   a second end surface opposite the first end surface; and
   a boss extending away from the first end surface, the boss extending from a proximal end located at the first end surface to a distal end located opposite the proximal end, wherein the boss comprises:
      a passageway extending from the distal end to the second end surface through the boss;
      an external surface extending from the proximal end to the distal end;
      a seal groove in the external surface located at the proximal end of the boss; and
      an O-ring seal located in the seal groove, wherein the O-ring seal is configured to at least partially compress a C-seal of the bearing housing.

2. The seal testing tool of claim 1, wherein the passageway is concentric to the external surface.

3. The seal testing tool of claim 1, further comprising:
   a first recess in the first end surface proximate the proximal end of the boss.

4. The seal testing tool of claim 3, wherein the first recess extends completely circumferentially around the proximal end of the boss.

5. The seal testing tool of claim 3, further comprising:
a second recess in the first end surface proximate the first recess, the second recess being recessed relative to the first recess.

6. The seal testing tool of claim 5, wherein the second recess extends at least partially circumferentially around the first recess.

7. The seal testing tool of claim 3, further comprising:
a mounting arm extending from the first end surface to the second end surface, wherein the first recess is recessed from the first end surface at the mounting arm.

8. The seal testing tool of claim 7, wherein the mounting arm further comprises a fastener through hole that extends from the second end surface to the first end surface through the mounting arm.

9. A proof pressure testing apparatus, comprising:
a bearing housing defining a bearing compartment, the bearing housing comprising:
a radially outward surface;
a mounting platform located on the radially outward surface, the mounting platform including a mounting surface;
a supply orifice extending from the mounting surface of the bearing housing into the bearing housing to a bottom and fluidly connecting to the bearing compartment, the supply orifice comprises a first portion extending from the mounting surface to a seat surface and a second portion extending from the seat surface to the bottom; and
a C-seal located in the first portion; and
a seal testing tool comprising:
a first end surface;
a second end surface opposite the first end surface; and
a boss extending away from the first end surface and into the supply orifice, the boss extending from a proximal end located at the first end surface to a distal end located opposite the proximal end, wherein the boss comprises:
a passageway extending from the distal end to the second end surface through the boss;
an external surface extending from the proximal end to the distal end;
a seal groove in the external surface located at the proximal end of the boss; and
an O-ring seal located in the seal groove, the O-ring seal abutting the C-seal,
wherein the O-ring seal at least partially compresses the C-seal.

10. The proof pressure testing apparatus of claim 9, wherein the passageway is concentric to the external surface.

11. The proof pressure testing apparatus of claim 9, wherein the seal testing tool further comprises:
a first recess in the first end surface proximate the proximal end of the boss.

12. The proof pressure testing apparatus of claim 11, wherein the first recess extends completely circumferentially around the proximal end of the boss.

13. The proof pressure testing apparatus of claim 11, wherein the seal testing tool further comprises:
a second recess in the first end surface proximate the first recess, the second recess being recessed relative to the first recess.

14. The proof pressure testing apparatus of claim 13, wherein the second recess extends at least partially circumferentially around the first recess.

15. The proof pressure testing apparatus of claim 11, wherein the seal testing tool further comprises:
a mounting arm extending from the first end surface to the second end surface, wherein the first recess is recessed from the first end surface at the mounting arm.

16. The proof pressure testing apparatus toss of claim 15, wherein the mounting arm further comprises a fastener through hole that extends from the second end surface to the first end surface through the mounting arm.

17. A method of performing a proof pressure test on a bearing housing for a gas turbine engine, the method comprising:
obtaining the bearing housing, the bearing housing defining a bearing compartment, wherein the bearing housing comprises:
a radially outward surface;
a mounting platform located on the radially outward surface, the mounting platform including a mounting surface;
a supply orifice extending from the mounting surface of the bearing housing into the bearing housing to a bottom and fluidly connecting to the bearing compartment, the supply orifice comprises a first portion extending from the mounting surface to a seat surface and a second portion extending from the seat surface to the bottom; and
a C-seal located in the first portion;
obtaining a seal testing tool, the seal testing tool comprising:
a first end surface;
a second end surface opposite the first end surface; and
a boss extending away from the first end surface, the boss extending from a proximal end located at the first end surface to a distal end located opposite the proximal end, wherein the boss comprises:
a passageway extending from the distal end to the second end surface through the boss;
an external surface extending from the proximal end to the distal end;
a seal groove in the external surface located at the proximal end of the boss; and
an O-ring seal located in the seal groove;
inserting the boss of the seal testing tool into the supply orifice of the bearing housing, the O-ring seal abutting the C-seal, wherein the O-ring seal at least partially compresses the C-seal;
securing the seal testing tool to the bearing housing;
plugging paths between the bottom of the supply orifice and the bearing compartment;
applying fluid pressure to the passageway; and
checking for leaks proximate an interface of the O-ring seal and the C-seal.

18. The method of claim 17 further comprising:
applying a leak detection solution proximate to the interface of the O-ring seal and the C-seal.

* * * * *